United States Patent
Chan et al.

(10) Patent No.: US 11,575,652 B2
(45) Date of Patent: Feb. 7, 2023

(54) COMMUNICATION SYSTEM AND COMMUNICATION METHOD FOR ONE-WAY TRANSMISSION

(71) Applicant: BlackBear (Taiwan) Industrial Networking Security Ltd., Hsinchu (TW)

(72) Inventors: Yuan Chen Chan, Hsinchu (TW); Po-Chih Hsu, Changhua County (TW)

(73) Assignee: BlackBear (Taiwan) Industrial Networking Security Ltd., Hsinchu (TW)

( * ) Notice: Subject to any disclaimer, the term of this patent is extended or adjusted under 35 U.S.C. 154(b) by 90 days.

(21) Appl. No.: 17/192,894

(22) Filed: Mar. 5, 2021

(65) Prior Publication Data
US 2022/0200961 A1    Jun. 23, 2022

Related U.S. Application Data (60) Provisional application No. 63/127,154, filed on Dec. 18, 2020.

(51) Int. Cl.
| | |
|---|---|
| H04L 9/00 | (2022.01) |
| H04L 9/40 | (2022.01) |
| G06F 9/4401 | (2018.01) |
| G06F 9/445 | (2018.01) |
| G06F 21/64 | (2013.01) |

(Continued)

(52) U.S. Cl.
CPC ........ *H04L 63/0263* (2013.01); *G06F 9/4401* (2013.01); *G06F 9/445* (2013.01); *G06F 21/64* (2013.01); *H04L 9/0643* (2013.01); *H04L 63/0245* (2013.01); *H04L 69/22* (2013.01)

(58) Field of Classification Search
CPC ... H04L 69/22; H04L 63/0245; H04L 9/0643; H04L 63/0263; G06F 21/64; G06F 9/445; G06F 9/4401
USPC .......................................................... 726/1
See application file for complete search history.

(56) References Cited

U.S. PATENT DOCUMENTS

| | | |
|---|---|---|
| 5,703,562 A | 12/1997 | Nilsen |
| 7,649,452 B2 | 1/2010 | Zilberstein et al. |
| 8,250,235 B2 | 8/2012 | Harvey et al. |

(Continued)

FOREIGN PATENT DOCUMENTS

| | | |
|---|---|---|
| EP | 2849407 | 3/2015 |
| TW | 201843981 | 12/2018 |

OTHER PUBLICATIONS

"Office Action of Taiwan Counterpart Application", dated Feb. 16, 2022, p. 1-p. 6.

(Continued)

*Primary Examiner* — Josnel Jeudy
(74) *Attorney, Agent, or Firm* — JCIPRNET (57) ABSTRACT

A communication system and a communication method for one-way transmission are provided. The communication method includes: transmitting a filtering rule to a programmable logic device by a server; receiving a signal and obtaining data from the signal by the server; packing the data to generate at least one data packet by the server; transmitting the at least one data packet to the programmable logic device by the server; and determining, according to the filtering rule, whether to output the at least one data packet by the programmable logic device.

13 Claims, 4 Drawing Sheets

(51) Int. Cl.
*H04L 9/06* (2006.01)
*H04L 69/22* (2022.01)

(56) References Cited

U.S. PATENT DOCUMENTS

| | | | |
|---|---|---|---|
| 8,250,358 | B2 | 8/2012 | Cheng |
| 8,352,450 | B1 | 1/2013 | Mraz et al. |
| 8,353,022 | B1 | 1/2013 | Menoher et al. |
| 8,732,453 | B2 | 5/2014 | Mraz et al. |
| 8,776,254 | B1 | 7/2014 | Mraz et al. |
| 8,891,546 | B1 | 11/2014 | Frenkel et al. |
| 8,893,253 | B2 | 11/2014 | Cianfrocca |
| 9,088,558 | B2 | 7/2015 | Curry et al. |
| 9,306,953 | B2 | 4/2016 | Mraz et al. |
| 9,521,120 | B2 | 12/2016 | Ferry |
| 9,736,121 | B2 | 8/2017 | Mraz et al. |
| 9,749,011 | B2 | 8/2017 | Kim et al. |
| 9,762,536 | B2 | 9/2017 | Frenkel et al. |
| 9,847,972 | B2 | 12/2017 | Frenkel et al. |
| 10,218,715 | B2 | 2/2019 | Thomson et al. |
| 2002/0080771 | A1 | 6/2002 | Krumel |
| 2003/0037172 | A1* | 2/2003 | Lacombe ............ G06F 11/0757 714/E11.003 |
| 2004/0205056 | A1* | 10/2004 | Mori ........................ G06F 7/02 |
| 2013/0010954 | A1 | 1/2013 | Falk et al. |
| 2013/0094619 | A1* | 4/2013 | Shellhammer ...... H04L 27/2647 375/343 |
| 2013/0152206 | A1 | 6/2013 | Staubly |
| 2014/0304803 | A1* | 10/2014 | Pope .................... H04L 63/0236 726/13 |
| 2015/0030027 | A1* | 1/2015 | Manzella ............ H04L 12/4625 370/392 |
| 2017/0353368 | A1 | 12/2017 | Blocher et al. |
| 2019/0364136 | A1* | 11/2019 | Naaman ................ G06F 16/182 |
| 2020/0053048 | A1 | 2/2020 | Frenkel |
| 2020/0120071 | A1 | 4/2020 | Wimmer et al. |
| 2020/0127974 | A1 | 4/2020 | Morlando |
| 2020/0259585 | A1 | 8/2020 | Aust et al. |
| 2020/0342153 | A1 | 10/2020 | Staubly et al. |

OTHER PUBLICATIONS

Heo Youngjun et al., "A Design of Unidirectional Security Gateway for Enforcement Reliability and Security of Transmission Data in Industrial Control Systems", 2016 18TH International Conference on Advanced Communication Technology (ICACT), Jan. 2016, pp. 310-333.

"Search Report of Europe Counterpart Application", dated Nov. 24, 2021, pp. 1-10.

* cited by examiner

COMMUNICATION SYSTEM AND COMMUNICATION METHOD FOR ONE-WAY TRANSMISSION

CROSS-REFERENCE TO RELATED APPLICATION

This application claims the priority benefit of U.S. provisional application Ser. No. 63/127,154, filed on Dec. 18, 2020. The entirety of the above-mentioned patent application is hereby incorporated by reference herein and made a part of this specification.

BACKGROUND

Technical Field

The disclosure is directed to a communication system and a communication method for one-way transmission.

Description of Related Art

In order to prevent a secure site (or OT: operation technology site) from being attacked by computer virus or hackers from Internet, a one-way transmission technique is normally used for performing a data transmission between the secure site and an unsecure site (or IT: information technology site). A one-way link may limit the direction of signals such that the signals can only be transmitted from the secure site to the unsecure site, and no signals can be transmitted from the unsecure site to the secure site. However, the secure site is not always safe even if a one-way link is implemented between the secure site and the unsecure site. For example, a device in the secure site is easy to be attacked in a firmware upgrading procedure or in a maintenance period. If the device in the secure site has been attacked, the device may transmit needless information such as malicious virus to the unsecure site. Therefore, how to protect devices in the unsecure site from being inflected by devices in the secure site is an important issue to the art.

SUMMARY

Accordingly, the present disclosure is directed to a communication system and a communication method for one-way transmission. The present disclosure may prevent devices in the unsecure site from being inflected by devices in the secure site.

The present invention is directed to a communication system for one-way transmission. The communication system includes a server and a one-way link circuit. The server including a processor. The one-way link circuit including a programmable logic device, wherein the one-way link circuit is communicatively connected to the server, wherein the processor is configured to: transmit a filtering rule to the programmable logic device; receive a signal and obtain data from the signal; pack the data to generate at least one data packet; and transmit the at least one data packet to the programmable logic device, wherein the programmable logic device is configured to: determine whether to output the at least one data packet according to the filtering rule.

In an exemplary embodiment of the present invention, the processor transmits the filtering rule to the programmable logic device by a message corresponding to a public key, wherein the programmable logic device includes: a trusted platform module obtaining the filtering rule from the message according to a private key corresponding to the public key.

In an exemplary embodiment of the present invention, the server further including: a second programmable logic device and a watchdog timer. The second programmable logic device is coupled to the processor. The watchdog timer is coupled to the second programmable logic device and the processor, wherein the watchdog timer reset the processor to reboot the server in response to not receiving a command from the second programmable logic device in a preconfigured time period.

In an exemplary embodiment of the present invention, the server further including a main memory and a storage medium. The main memory is coupled to the processor. The storage medium is coupled to the processor, wherein the storage medium stores a kernel program; wherein the processor reboots the server by loading the kernel program to the main memory.

In an exemplary embodiment of the present invention, the filtering rule is associated with a packet format of the at least one data packet.

In an exemplary embodiment of the present invention, the packet format includes a proprietary header, wherein the proprietary header includes a synchronization word and a checksum of the proprietary header, wherein the programmable logic device determines whether to output the at least one data packet by checking the synchronization word and the checksum according to the filtering rule.

In an exemplary embodiment of the present invention, the proprietary header further including at least one of: a system time stamp, a Hash method of the data, an encryption method of the data, a total size of the data, a data size of the at least one data packet, and a sequence number of the at least one data packet.

In an exemplary embodiment of the present invention, the packet format is an Ethernet packet format.

In an exemplary embodiment of the present invention, the packet format further including: a type-length-value frame storing at least one of a Hash value corresponding to the Hash method and a destination file name of a file corresponding to the at least one data packet.

In an exemplary embodiment of the present invention, the server further including a transceiver coupled to the processor, wherein the processor receives the filtering rule through the transceiver.

In an exemplary embodiment of the present invention, the server further including a transceiver coupled to the processor, wherein the processor receives the signal through the transceiver.

In an exemplary embodiment of the present invention, the signal is corresponded to a bi-directional protocol, wherein the at least one data packet is corresponded to a unidirectional protocol.

In an exemplary embodiment of the present invention, the communication system further including a storage device coupled to the one-way link circuit, wherein the programmable logic device transmits the at least one data packet to the storage device in response to determining not to output the at least one data packet.

The present invention is directed to a communication method for one-way transmission. The communication method includes: transmitting a filtering rule to a programmable logic device by a server; receiving a signal and obtaining data from the signal by the server; packing the data to generate at least one data packet by the server; transmitting the at least one data packet to the programmable logic device by the server; determining, according to the filtering rule, whether to output the at least one data packet by the programmable logic device.

In view of foregoing, the present disclosure may implement a one-way transmission channel by a programmable logic device which can filter data packets. No needless information will be sent from the secure site to the unsecure site.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In order to make the disclosure more comprehensible, several embodiments are described below as examples of implementation of the disclosure. Moreover, elements/components/steps with the same reference numerals are used to represent identical or similar parts in the figures and embodiments where appropriate.

Figure 1:
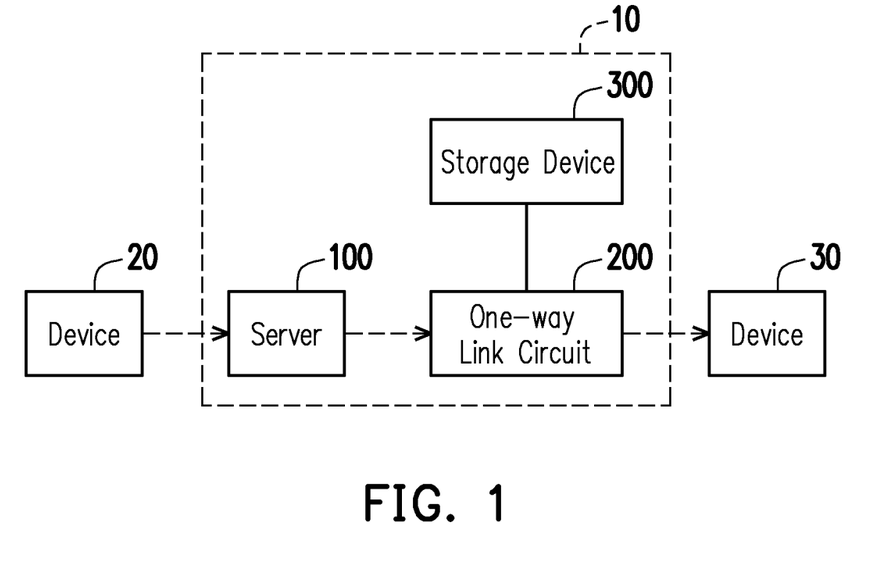
FIG. 1 illustrates a schematic diagram of the communication system for one-way transmission according to an embodiment of the disclosure.

FIG. 1 illustrates a schematic diagram of the communication system 10 for one-way transmission according to an embodiment of the disclosure. The communication system 10 may limit the direction of signals such as the signals can only be transmitted from at least one device 20 in the OT site to at least one device 30 in the IT site. The communication system 10 may include a server 100 and a one-way link circuit 200. In one embodiment, the communication system 10 may further include the device 30, wherein the device 30 may provide the receiving server features includes the resolving the proprietary header, decryption and hash for data integrity functions. In one embodiment, the communication system 10 may further include a storage device 300. The one-way link circuit 200 may be coupled to the server 100 and the storage device 300.

Figure 2:
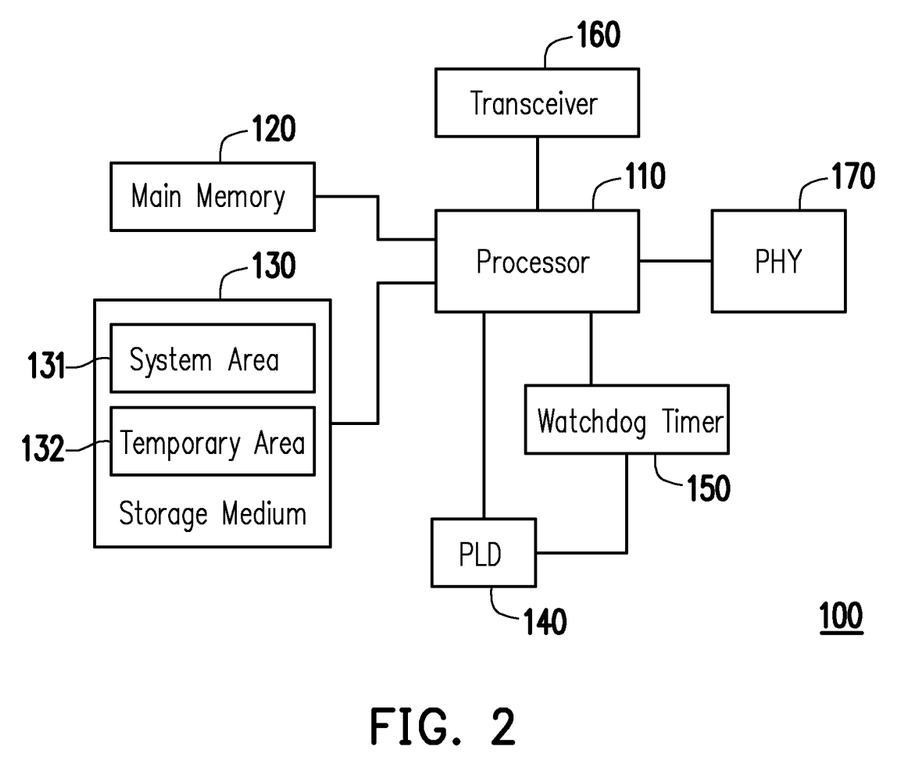
FIG. 2 illustrates a schematic diagram of the server according to an embodiment of the disclosure.

FIG. 2 illustrates a schematic diagram of the server 100 according to an embodiment of the disclosure. The server 100 may include a processor 110, a main memory 120, a storage medium 130, a programmable logic device (PLD) 140, a watchdog timer 150, a transceiver 160, and a physical layer (PHY) port 170.

The processor 110 may be, for example, a central processing unit (CPU), a programmable microprocessor, a digital signal processor (DSP), a programmable controller, an application specific integrated circuit (ASIC), a graphics processing unit (GPU), a PLD or other similar elements, or a combination thereof. The processor 110 may be coupled to the main memory 120, the storage medium 130, the PLD 140, the watchdog timer 150, the transceiver 160, and the PHY 170, and may be capable of accessing and executing modules, software, or various applications stored in the main memory 120 and the storage medium 130.

The main memory 120 or the storage medium 130 may include, for example, any type of fixed or removable random access memory (RAM), a read-only memory (ROM), a flash memory, a hard disk drive (HDD), a solid state drive (SSD) or similar elements, or a combination thereof, configured to record a plurality of modules or various applications executable by the processor 110. In the present embodiment, the storage medium 130 may be divided into a system area 131 and a temporary area 132. The system area 131 may store a kernel program of an operating system (OS) such as Linux, and the system area is read-only. The temporary area 132 may store temporary data such as log files.

The PLD 140 may include, for example, a programmable array logic (PAL), a generic array logic (GAL), a complex PLD (CPLD), a field programmable gate array (FPGA) or similar elements, or a combination thereof. The PLD 140 may be controlled by the processor 110 and may be coupled to the watchdog timer 150. The PLD 140 may be accessed by the processor 110 under the instructions of the operating system to periodically transmit a command (or a special address) to clear the watchdog timer 150. If the watchdog timer 150 does not receive the command from the PLD 140 in a pre-configured timer period, the watchdog timer 150 may reset the processor 110 to reboot the server 100.

The transceiver 160 may transmit or receive signals wirelessly or wiredly. The transceiver 160 may be, for example, a transmitting or receiving hardware device configured to receive or send signal based on universal serial bus (USB), Bluetooth, Wi-Fi, Zigbee or other wireless transmission, but is not limited thereto. The transceiver 160 may also perform such operations as low noise amplifying (LNA), impedance matching, frequency mixing, up-down frequency conversion, filtering, amplification, and similar operations.

The PHY 170 may be an Ethernet PHY. The processor 110 may communicatively connect to the one-way link circuit 200 via the PHY 170.

Figure 3:
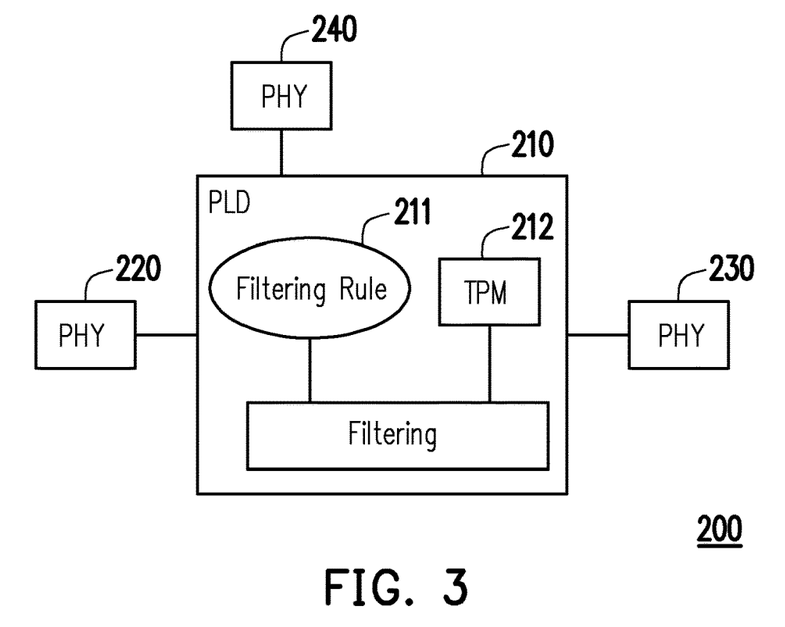
FIG. 3 illustrates a schematic diagram of the one-way link circuit according to an embodiment of the disclosure.

FIG. 3 illustrates a schematic diagram of the one-way link circuit 200 according to an embodiment of the disclosure. The one-way link circuit 200 may include a PLD 210, a PHY 220, a PHY 230, and a PHY 240.

The PLD 210 may include, for example, a PAL, a GAL, a CPLD, a FPGA or similar elements, or a combination thereof. The PLD 210 may store a filtering rule 211 and a trusted platform module (TPM) 212. The PLD 210 may communicatively connect to the server 100, the device 30, and the storage device 300 (or an external device) via the PHY 220, PHY 230, and PHY 240 respectively.

The device 30 may include necessary components to run the device 30, wherein the necessary components may include but not limited to a processor unit (e.g., a processor), a communication unit (e.g., communication chip and/or transceiver) and storage unit (e.g., a RAM, a ROM, a flash memory, a HDD, or an SSD).

Figure 4:
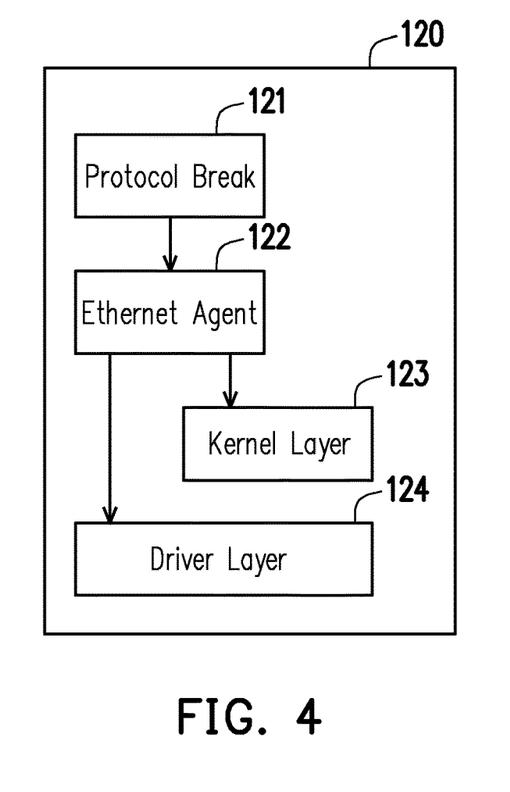
FIG. 4 illustrates a schematic diagram of the software architecture executed in the main memory according to an embodiment of the disclosure.

When the server 100 is booted up, the kernel program stored in the system area 131 may be loaded into the main memory 120, and the main memory 120 may become a RAM disk to initial the operating system. FIG. 4 illustrates a schematic diagram of the software architecture executed in the main memory 120 according to an embodiment of the disclosure. The main memory 120 which the kernel program being loaded on may include a plurality of modules such as a protocol break 121, an Ethernet agent 122, a kernel layer 123, and a driver layer 124.

The Ethernet agent 122 may periodically transmit a command to the watchdog timer 150 via the driver layer 124. The command may be forward to the watchdog timer 150 by the PLD 140. If the processor is been attacked so that the watchdog timer 150 cannot receive the command form the Ethernet agent 122 in a pre-configured time period. The watchdog timer 150 may thus reset the processor 110 to reboot the server 100 so as to protect the protocol break 121 and Ethernet agent 122 from being replaced or destroyed. Since the kernel program is saved in the system area 131 which is read-only, the functions of the rebooted server 100 may be as the same as the functions of the original server 100.

The processor 110 may receive a signal (e.g., from the device 20) via the transceiver 160. In one embodiment, the received signal may be corresponded to a bi-directional protocol such as transmission control protocol (TCP). In one embodiment, the received signal may be corresponded to a unidirectional protocol such as user datagram protocol (UDP), real time transport protocol (RTP), simple network management protocol (SNMP), routing information protocol (RIP), or domain name server (DNS) lookup. The protocol break 121 may obtain data from the received signal and the Ethernet agent 122 may generates at least one data packet by packing the data with a protocol different from the protocol of the received signal. The protocol of the at least one data packet may be corresponded to a unidirectional protocol. That is, the protocol break 121 may convert the received signal into a data packet corresponding to the unidirectional protocol in response to the received signal being corresponding to the bi-directional protocol. The Ethernet agent 122 may make, according to the kernel layer 123, the processor 110 to transmit the at least one data packet to the one-way link circuit 200 via the PHY 170.

Figure 5:
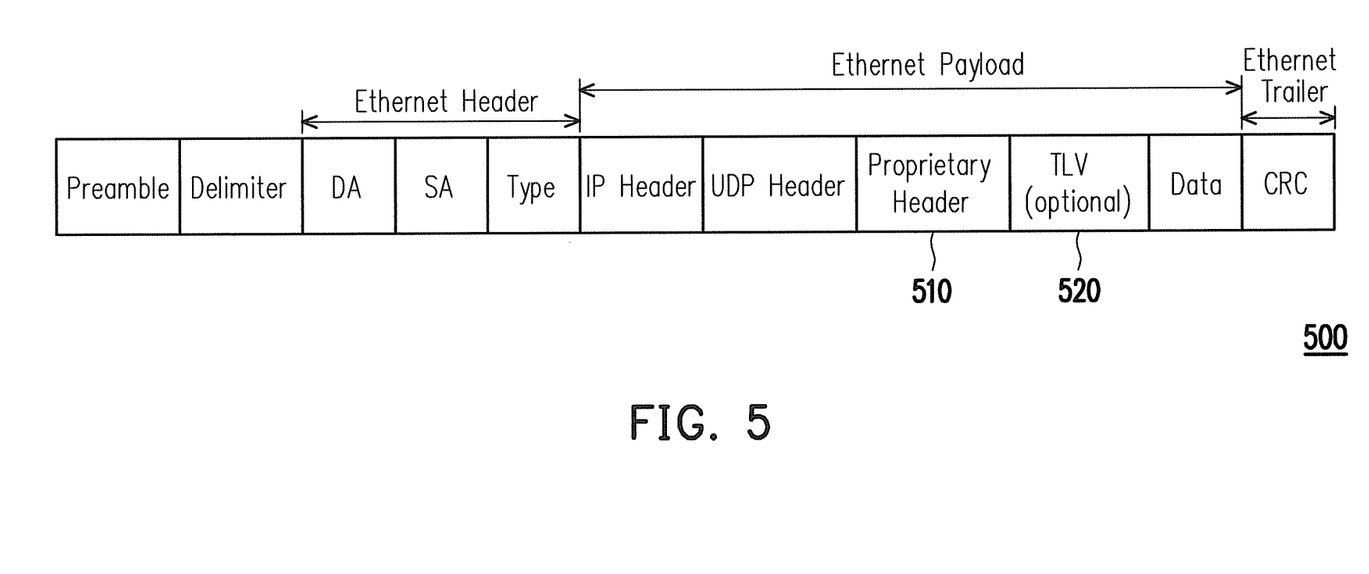
FIG. 5 illustrates a schematic diagram of the packet format according to an embodiment of the disclosure.

The at least one data packet may be packed in packet format 500 as shown in FIG. 5. FIG. 5 illustrates a schematic diagram of the packet format 500 according to an embodiment of the disclosure. The packet format 500 may be corresponded to an Ethernet packet format such as UDP, wherein field "DA" may include a destination address, field "SA" may include a source address, field "Type" may include an Ether type (e.g., 0x0800 for IP packet or 0x8100 for IEEE 802.1Q), and field "CRC" may include a cyclic redundancy check (CRC) code. A proprietary header 510 may be configured in the payload of the packet format 500, wherein the proprietary header 510 may include a synchronization word, an encryption method (e.g., AES encryption), a Hash method, a system time stamp, a total size of the data corresponding to the at least one data packet (i.e., total size of session), a data size of the at least one data packet (i.e., packet size), a sequence number of the at least one data packet (i.e., sequence number of session), and a checksum of the proprietary header 510. All data packets corresponding packet format 500 are generated by the Ethernet agent 122. The payload data is encrypted according to information from the proprietary header 510 with the key generated by the permutation of the hash function of the proprietary header 510. A system time stamp with precision on micro-second guarantees that the same data in different times be encrypted to different encrypted data respectively. That is, each packet may have its own dedicated key for the data encryption.

TABLE 1

Synchronization Word
System Time Stamp (micro-second)
Encryption Method
Hash Method
Total size of Session
Sequence Number of Session
Packet size
Check Sum The checksum of the proprietary header 510 can be determined according to all data except the checksum itself in the proprietary header 510. Since the proprietary header of a specific data packet is always different to the proprietary header of another data packet, the checksum of the specific data packet is always different to the checksum of the another data packet.

In one embodiment, the packet format 500 of the at least one data packet may further include a type-length-value (TLV) frame 520. The TLV frame 520 may store a Hash value corresponding to the Hash method in the proprietary header 510, and may store a destination file name of a file corresponding to the at least one data packet.

The PLD 210 may receive the at least one data packet transmitted by the server 100 via the PHY 220. After receiving the at least one data packet, the PLD 210 may filter the at least one data packet according to the filtering rule 211. Specifically, the PLD 210 may determine whether to output the at least one data packet (e.g., to the device 30 via the PHY 230) according to the proprietary header 510 and the filtering rule 211, wherein the filtering rule 211 may be associated with the packet format 500 or the proprietary header 510. In one embodiment, the filtering rule 211 may further include an IP address checking or a UDP port number. The PLD 210 may determine whether to output the at least one data packet by at least checking the synchronization word and the checksum of the proprietary header 510. If the synchronization word is matched with the filtering rule 211 and the checksum is matched with the other fields of the proprietary header 510 (e.g., all data except the checksum itself in Table 1), the PLD 210 may determine to output the at least one data packet via the PHY 230. If at least one of the synchronization word or the checksum is not correct, the PLD 210 may determine to drop the at least one data packet or may determine to transmit the at least one data packet to the storage device 300 (or an external device) via the PHY 240. The storage device 300 may be, for example, a RAM, A ROM, a flash memory, a HDD, an SSD or a combination of the above components, the disclosure is not limited thereto. The storage device 300 may store the at least one data packet received from the PLD 210 for user reference. The aforementioned external device may be, for example, a diagnosis server. The PLD 210 may transmit the at least one data packet to the external device such that the external device may analyze where the mis matched packets come from or goes to.

In one embodiment, the device 30 may receive the at least one data packet from the PLD 210, wherein the at least one data packet may include the proprietary header 510. The device 30 may decrypt the at least one data packet so as to retain the data from the at least one data packet. The device 30 may decrypt the at least one data packet according to information from the proprietary header 510 such as the encryption method or the Hash method recited in the proprietary header 510. In one embodiment, the device 30 may convert the protocol of the data from a unidirectional protocol to a bi-directional protocol. For example, the device 30 may convert the protocol of the data from a unidirectional protocol to a bi-directional protocol before transmitting the data to another device.

In one embodiment, the PLD 210 may obtain the filtering rule 211 from the server 100. Specifically, the processor 110 of the server 100 may transmit the filtering rule 211 to the PLD 210 via a message corresponding to a public key. For example, the processor 110 may generate the message carrying the filtering rule 211 according to the public key. The processor 110 may receive the filtering rule 211 via the transceiver 160. For example, the processor 110 may communicatively connect to an input device (e.g., a computer with a keyboard) via the transceiver 160. A user may operate the input device to transmit the filtering rule 211 to the server 100, wherein the filtering rule 211 may be defined by the user according to the requirements of the user.

The PLD 210 may receive the message carrying the filtering rule 211 from the server 100 via the PHY 220. After the message being received, TPM 212 may decode the message so as to obtain the filtering rule 211 from the message. TPM 212 may decode the message according to a private key corresponding to the public key. The public key and the private key may be pre-stored in the server 100 and the PLD 210 respectively.

Figure 6:
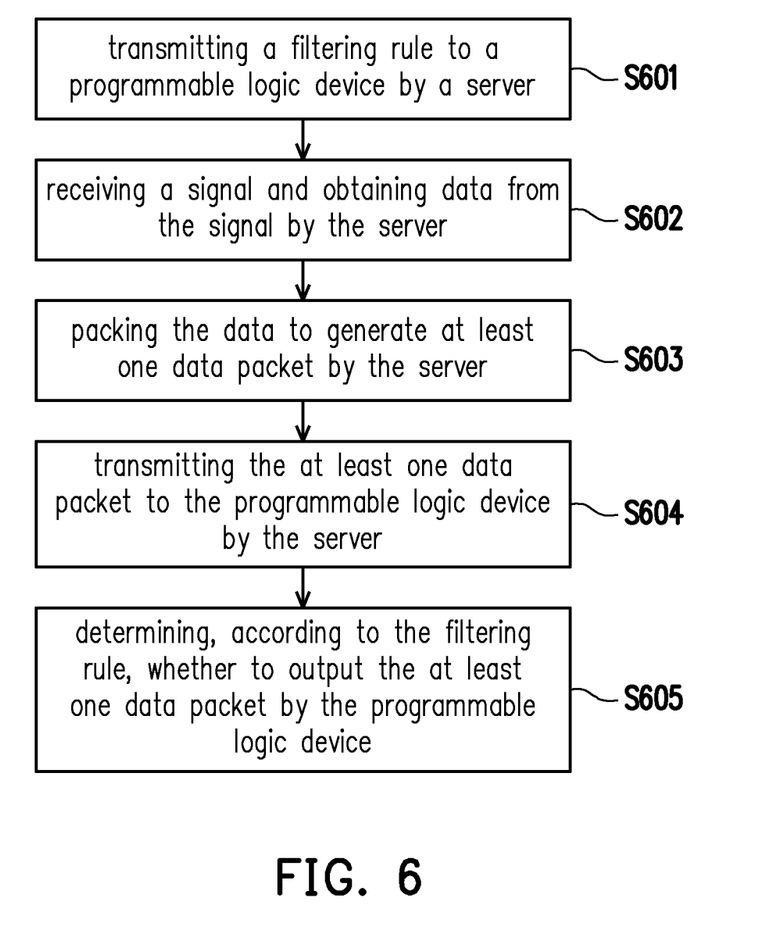
FIG. 6 illustrates a flowchart of the communication method for one-way transmission according to an embodiment of the disclosure.

FIG. 6 illustrates a flowchart of the communication method for one-way transmission according to an embodiment of the disclosure, wherein the communication method may be implemented by the communication system 100 as shown in FIG. 1. In step S601, transmitting a filtering rule to a programmable logic device by a server. In step S602, receiving a signal and obtaining data from the signal by the server. In step S603, packing the data to generate at least one data packet by the server. In step S604, transmitting the at least one data packet to the programmable logic device by the server. In step S605, determining, according to the filtering rule, whether to output the at least one data packet by the programmable logic device.

In summary, the present disclosure may prevent needless information from being sent to the unsecure site by implementing the one-way transmission channel between the secure site and the unsecure site based on a programmable logic device such as FPGA. The programmable logic device may filter data packets sent from the secure site to the unsecure site according to a filtering rule associated with a packet format. Therefore, a data packet not complied with the packet format cannot be sent to the unsecure site via the one-way transmission channel. On the other hand, the present disclosure proposes a method to guarantee the software process such as Ethernet agent not to be replaced by using a hardware design watchdog mechanism.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A communication system for one-way transmission, comprising:
   a server comprising a processor; and
   a one-way link circuit comprising a programmable logic device, wherein the one-way link circuit is communicatively connected to the server, wherein
   the processor is configured to:
      transmit a filtering rule to the programmable logic device;
      receive a signal and obtain data from the signal;
      pack the data to generate at least one data packet; and
      transmit the at least one data packet to the programmable logic device, wherein the programmable logic device is configured to:
      determine whether to output the at least one data packet according to the filtering rule, wherein
      the filtering rule is associated with a packet format of the at least one data packet, wherein the packet format comprises a proprietary header, wherein the proprietary header comprises:
      a system time stamp, a Hash method of the data, and an encryption method of the data.

2. The communication system according to claim 1, wherein the processor transmits the filtering rule to the programmable logic device by a message corresponding to a public key, wherein the programmable logic device comprises:
   a trusted platform module obtaining the filtering rule from the message according to a private key corresponding to the public key.

3. The communication system according to claim 1, wherein the server further comprising:
   a second programmable logic device coupled to the processor; and
   a watchdog timer coupled to the second programmable logic device and the processor, wherein
   the watchdog timer reset the processor to reboot the server in response to not receiving a command from the second programmable logic device in a pre-configured time period.

4. The communication system according to claim 3, wherein the server further comprising:
   a main memory coupled to the processor; and
   a storage medium coupled to the processor, wherein
   the storage medium stores a kernel program; wherein
   the processor reboots the server by loading the kernel program to the main memory.

5. The communication system according to claim 1, wherein the proprietary header further comprises:
   a synchronization word and a checksum of the proprietary header, wherein the programmable logic device determines whether to output the at least one data packet by checking the synchronization word and the checksum according to the filtering rule.

6. The communication system according to claim 5, wherein the proprietary header further comprising at least one of:

a total size of the data, a data size of the at least one data packet, and a sequence number of the at least one data packet.

7. The communication system according to claim 6, wherein the packet format is an Ethernet packet format.

8. The communication system according to claim 7, wherein the packet format further comprising:
   a type-length-value frame storing at least one of a Hash value corresponding to the Hash method and a destination file name of a file corresponding to the at least one data packet.

9. The communication system according to claim 1, wherein the server further comprising:
   a transceiver coupled to the processor, wherein the processor receives the filtering rule through the transceiver.

10. The communication system according to claim 1, wherein the server further comprising:
    a transceiver coupled to the processor, wherein the processor receives the signal through the transceiver.

11. The communication system according to claim 1, wherein the signal is corresponded to a bi-directional protocol, wherein the at least one data packet is corresponded to a unidirectional protocol.

12. The communication system according to claim 1, further comprising:
    a storage device coupled to the one-way link circuit, wherein the programmable logic device transmits the at least one data packet to the storage device in response to determining not to output the at least one data packet.

13. A communication method for one-way transmission, comprising:
    transmitting a filtering rule to a programmable logic device by a server;
    receiving a signal and obtaining data from the signal by the server;
    packing the data to generate at least one data packet by the server;
    transmitting the at least one data packet to the programmable logic device by the server; and
    determining, according to the filtering rule, whether to output the at least one data packet by the programmable logic device, wherein
    the filtering rule is associated with a packet format of the at least one data packet, wherein the packet format comprises a proprietary header, wherein the proprietary header comprises:
    a system time stamp, a Hash method of the data, and an encryption method of the data.

* * * * *